Patented May 31, 1932

1,860,477

UNITED STATES PATENT OFFICE

CARL F. RICHTER, OF WATERTOWN, NEW YORK, ASSIGNOR TO STEBBINS ENGINEERING AND MANUFACTURING COMPANY, OF WATERTOWN, NEW YORK, A CORPORATION OF NEW YORK

DIGESTER

No Drawing.    Application filed October 28, 1931. Serial No. 571,681.

This invention relates to improvements in digesters, and more especially to carbon brick linings for the digesters used in the acid and alkali processes employed in the digestion of fibrous material such as wood chips.

For a great many years, ceramics have been used for linings in digesters employed by the pulp and paper trade for the manufacture of chemical pulp. There have been various combinations of brick, tile, cement, and other silicous materials installed with varying degrees of success. The most successful installations have been comprised of specially prepared hand moulded digester brick having suitable proportions of silica and alumina. In spite of the apparent success of these particular linings, it has been found that uniformity of product cannot exist on account of the variables encountered in the manufacture of the brick. It is well known that there is considerable variation in the clays themselves, the mixing, moulding, burning, cooling and final selection of finished brick.

This combination of variables results in a non-uniformity of product, which invariably will cause excess maintenance and repairing on certain linings. The length of service period or life of these latter linings is of course reduced thereby. To overcome this weakness in the industry, I have studied the possibility of applying carbon to digester linings in the form of bricks laid in the same manner as ceramic brick.

Carbon possesses many advantageous characteristics chemically, especially a complete inertness to acids and alkali. It is acknowledged by carbon manufacturers, however, that because of the high porosity of carbon it cannot be used to withstand hydrostatic pressure without a resultant seepage of liquid. They further state that carbon cannot be considered for structures where imperviousness to liquids is absolutely essential.

Furthermore, it is well known in the pulp and paper trade, and as a matter of fact, in all technical circles, that the cement backing in digester linings is readily destroyed by the cooking liquor and of course that imperviousness of the brick lining in front of the backing is essential.

In spite of the above beliefs, I, in actual practice, have discovered that even though the carbon is more porous than ceramics, nevertheless, in the sulphite process, the chemical of the cooking liquor during cooking, seals the pores and prevents seepage of the liquor through the carbon brick to the backing. I have also found in practicing my invention, if carbon brick is employed as a lining for alkaline process digesters, that due to the minuteness of the pores, the liquor cannot be stored within these pores in sufficient quantity to cause unfavorable reaction on the carbon brick, when temperature is reduced at the end of the cook.

Moreover, the low termal expansion of the carbon is favorable to physical action of the lining and avoids creating excess pressure on the digester shell. This advantage will be welcomed by the pulp and paper trade.

I have determined by actual commercial test that in spite of prior belief to the contrary, the porous carbon will withstand the action of cooking liquor, temperature and pressure employed in the digesters used for production of chemical pulp. The tests referred to have been made on both the acid and alkali processes. In the acid process, two experimental digesters were lined with carbon brick under my direction, and in the alkaline process, one large commercial digester was lined with carbon brick under my direction. I have thus proved, by the successful outcome of these experiments, that porous carbon can be successfully applied to digester linings.

The only difference between the acid resisting and alkali resisting carbon linings is the type of cement used for binding together the carbon brick. All joints thus formed by these respective cements are "pointed" occasionally with fresh cement.

I have, at the same time, proved that both coke base carbon, coal base carbon or any mixture of the two bases, can be applied to digester linings. The fact that the finished carbon brick is chemically inert and possesses low thermal expansion makes the question of bases unimportant.

While I have disclosed what I now consider to be preferred embodiments of the invention in such manner that the same may be understood by those skilled in the art, I am aware that changes may be made in the details disclosed, without departing from the spirit of the invention, as expressed in the claims.

What I claim and desire to secure by Letters Patent is:

1. A digester for cooking fibrous materials with chemical liquors, lined throughout with carbon bricks.

2. A digester for cooking fibrous materials with chemical liquors, lined throughout with carbon bricks, said bricks having lower thermal expansion than ceramics.

3. A digester for cooking fibrous materials with chemical liquors, lined throughout with carbon bricks, said carbon bricks having smaller pores than the ceramics used for digester linings.

4. A digester for cooking fibrous materials with chemical liquors, lined throughout with carbon bricks, said carbon bricks having smaller pores than the usual ceramic linings of digesters, and having a lower thermal expansion than said ceramic linings.

5. A digester for use in the acid process of digesting fibrous material, lined throughout with carbon brick, the pores of which are of insufficient size to permit the liquor used in the digester to penetrate the backing of the bricks.

6. A digester for use in the alkaline methods of cooking fibrous material, lined throughout with carbon bricks, the pores of which are so minute as to prevent the cooking liquor from being stored within the same in sufficient quantity to cause unfavorable reaction on the carbon bricks when temperature is reduced at the end of the cook.

7. A digester for use in cooking fibrous material with chemical liquors, provided with a backing lined with carbon bricks.

In testimony whereof, I hereto affix my signature.

CARL F. RICHTER.